UNITED STATES PATENT OFFICE.

F. LAMBRUN, OF NEW ORLEANS, LOUISIANA.

IMPROVED COMPOSITION FOR PREVENTING INCRUSTATION IN STEAM-BOILERS.

Specification forming part of Letters Patent No. 44,001, dated August 30, 1864.

*To all whom it may concern:*

Be it known that I, F. LAMBRUN, M. D., of New Orleans, in the parish of Orleans and State of Louisiana, have invented a new and Improved Composition for Preventing Incrustation of Steam-Boilers, of which the following is a specification.

This invention consists in a composition made of chloride of potassium, sulphate of potash, silicate of potash, carbonate of potash, and carbonate of lime dissolved in water and mixed together to form a liquid of the density of from 22° to 23° Baumé, which, when introduced in a steam-boiler, will prevent the formation of scale on the flues or on the inner surface of a steam-boiler and keep the impurities contained in the water in suspense thereon, so that they can be blown out with the greatest ease and facility.

The proportion in which I mix the ingredients of my composition together is about as follows: chloride of potassium, one ounce; carbonate of soda, two ounces; carbonate of potash, three ounces; sulphate of potash, one ounce; silicate of potash, three ounces. Each of these ingredients is triturated or reduced to a fine powder, and after that they are mixed together and dissolved in about sixteen ounces of water. It takes three days to complete the solution, and after the lapse of that time the solution is filtered and it is ready for use. It has a density of 22° to 25° Baumé, and it is introduced into the boiler in quantities small or large, according to the nature and quantity of impurities contained in the water.

By the use of this composition the incrustation of a steam-boiler or the formation of scale on any part of the same can be entirely prevented, and the action of my composition is such that it does not cause a foaming in the boiler, and on cleaning the same out all the impurities which ordinarily form into scale will be found to be held in solution and can be readily blown out with the water. Furthermore, if my composition is introduced into old boilers, the scale already formed in the same will readily detach itself from the shell and flues and will be carried off by the current of water in blowing off.

I claim as new and desire to secure by Letters Patent—

The within-described composition for preventing the incrustation of steam-boilers, consisting of the ingredients above specified, and mixed in about the proportion and in the manner herein set forth.

F. LAMBRUN.

Witnesses:
 I. DEBERGUE,
 A. CALONGUE.